(12) United States Patent
Jacobi et al.

(10) Patent No.: US 7,952,037 B2
(45) Date of Patent: May 31, 2011

(54) METHOD AND APPARATUS FOR FORMING PORTIONS OF FIBROUS MATERIAL

(75) Inventors: Tobias Jacobi, Winsen (DE); Stefan Ehlermann, Rosengarten (DE); Hagen Geske, Rotenburg (DE)

(73) Assignee: Focke & Co. (DE)

( * ) Notice: Subject to any disclaimer, the term of this patent is extended or adjusted under 35 U.S.C. 154(b) by 342 days.

(21) Appl. No.: 12/120,679

(22) Filed: May 15, 2008

(65) Prior Publication Data

US 2008/0283070 A1    Nov. 20, 2008

(30) Foreign Application Priority Data

May 18, 2007  (DE) .................. 10 2007 023 511

(51) Int. Cl.
*B65G 47/16* (2006.01)
*B65G 43/08* (2006.01)
*A24C 5/39* (2006.01)
*G01G 13/02* (2006.01)

(52) U.S. Cl. .......... 177/52; 131/282; 131/108; 131/908; 131/909; 53/502; 222/77; 177/116; 177/119

(58) Field of Classification Search .................. 131/908, 131/909, 108, 282; 177/116–123, 52; 53/53, 53/54, 502; 222/55, 56, 77; 141/83
See application file for complete search history.

(56) References Cited

U.S. PATENT DOCUMENTS

| | | | | |
|---|---|---|---|---|
| 3,404,742 A | * | 10/1968 | Bonneric | 177/59 |
| 3,708,025 A | * | 1/1973 | Soler et al. | 177/1 |
| 4,243,135 A | * | 1/1981 | Heitmann | 198/370.07 |
| 4,428,179 A | * | 1/1984 | Jordan et al. | 53/502 |
| 4,531,597 A | * | 7/1985 | Focke et al. | 177/84 |
| 4,583,571 A | * | 4/1986 | Focke et al. | 141/83 |
| 4,617,974 A | * | 10/1986 | Focke et al. | 141/239 |
| 4,720,961 A | * | 1/1988 | Jordan | 53/502 |
| 4,814,072 A | * | 3/1989 | Von Wichert et al. | 209/535 |
| 5,005,338 A | * | 4/1991 | Kemkers et al. | 53/494 |
| 5,156,279 A | * | 10/1992 | Draghetti | 209/654 |
| 5,383,322 A | * | 1/1995 | Collins et al. | 53/53 |
| 2008/0283070 A1 | * | 11/2008 | Jacobi et al. | 131/286 |

FOREIGN PATENT DOCUMENTS

| | | |
|---|---|---|
| DE | 33 16 176 A1 | 11/1984 |
| DE | 33 16 176 A1 | 8/1986 |
| EP | 15 80 129 A1 | 9/2005 |

\* cited by examiner

*Primary Examiner* — Randy W Gibson
(74) *Attorney, Agent, or Firm* — Smith Risley Tempel Santos LLC; Laurence P. Colton

(57) ABSTRACT

A method and apparatus of forming portions of tobacco, and of removing the same by an conveyor having at least one path of holders for a respective portion, in which the holders are filled with individual portions of the contents at least two filling lines of one or more filling stations, and, prior to the individual filling operations, individual portions of the contents are weighed and weighed portions that satisfy the predetermined conditions—acceptable portions—are filled cyclically into the holders and weighed portions that do not satisfy the predetermined conditions are detected and ejected as defective portions, characterized by components and steps of (a) following detection of a defective portion, that holder which the filling line originally predetermined for filling this holder would have filled with the contents portion, on which the defective portion is based, had the contents portion satisfied the predetermined conditions—defective-portion holder—is sensed, and a filling line other than that originally predetermined for filling the defective-portion holder—compensating filling line—fills the defective-portion holder, preferably outside the original filling cycle thereof, with an acceptable portion that satisfies the predetermined conditions.

19 Claims, 5 Drawing Sheets

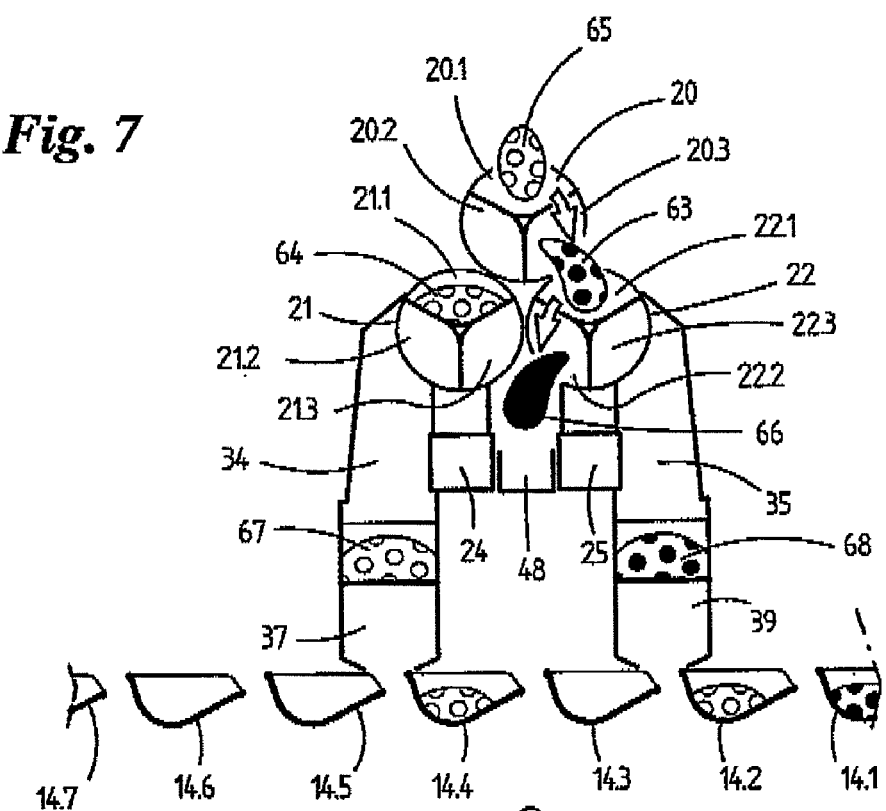
Fig. 7
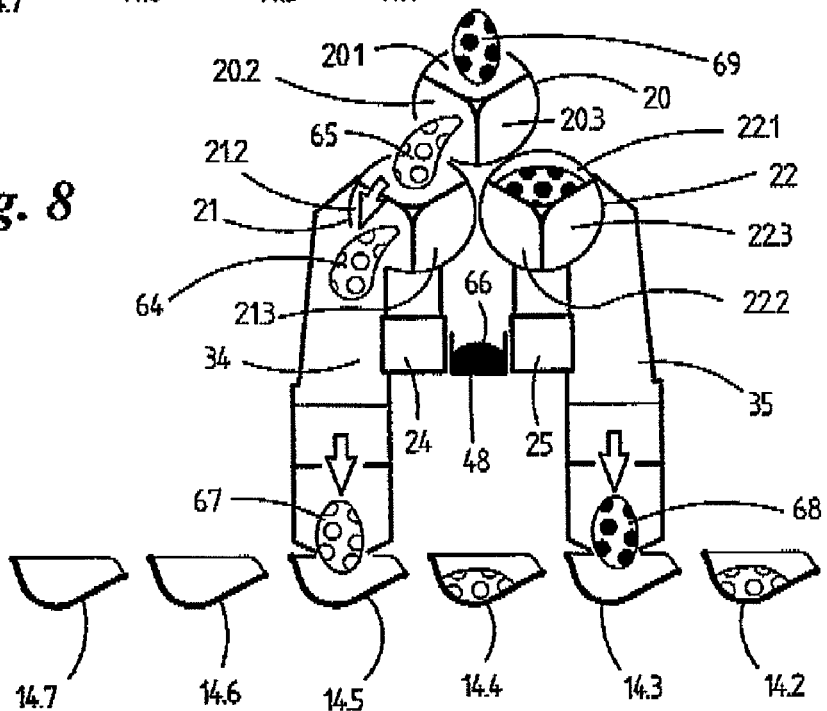
Fig. 8
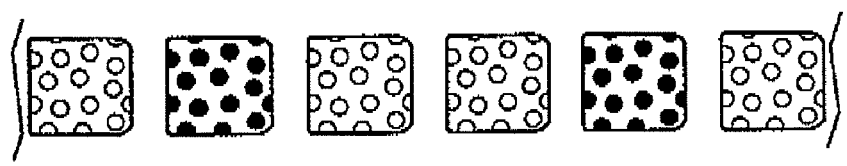

METHOD AND APPARATUS FOR FORMING PORTIONS OF FIBROUS MATERIAL

STATEMENT OF RELATED APPLICATIONS

This patent application is based on and claims convention priority under 35 USC §119 on German Patent Application No. 10 2007 023 511.0 having a filing date of 18 May 2007, which is incorporated herein in its entirety by this reference.

BACKGROUND OF THE INVENTION

1. Technical Field

The invention relates to a method of forming portions of fibrous material, in particular tobacco, and of removing the same by an (endless) conveyor having at least one path of holders for a respective portion, it being the case that the holders are filled with individual portions of the contents at least two filling lines of one or more filling stations, and that, prior to the individual filling operations, individual portions of the contents are weighed and weighed portions which satisfy the predetermined conditions—acceptable portions—are filled cyclically into the holders and weighed portions which do not satisfy the predetermined conditions are detected and ejected as defective portions. The invention also relates to an apparatus for implementing the method.

2. Prior Art

An apparatus which operates using such a method is described, for example in German Patent Application DE 33 16 176 A1. In this document, individual buckets of a bucket chain are filled with tobacco portions at filling stations. The individual filling operations take place in a certain cycle in dependence on the speed of the buckets of the bucket chain which are conveyed past the filling station. The disadvantage with the solution presented in DE 33 16 176 A1 is that individual buckets of the bucket chain may remain empty if a plurality of weighed portions which do not satisfy predetermined conditions for example ones which are heavier or lighter than a predetermined desired weight, are detected. These so-called unacceptable or defective portions are ejected and are not available for filling the buckets. Since the buckets continue to be guided past the filling station, or the corresponding filling line of the filling station, at a predetermined speed, individual buckets remain empty if the envisaged filling line cannot provide an acceptable portion at the point in time envisaged for filling.

BRIEF SUMMARY OF THE INVENTION

It is an object of the present invention, in the case of the method of the type mentioned in the introduction, to reduce the occurrence of holders, in particular buckets, not being filled on account of defective portions. It is also an object of the invention to specify an apparatus which operates using the method according to the invention.

Accordingly, the invention specifies an (automatic) method of forming portions of fibrous material, preferably tobacco, and of removing the same by an (endless) conveyor having at least one path of holders for a respective portion, it being the case that the holders are filled with individual portions of the contents at least two filling lines of one or more filling stations, and that, prior to the individual filling operations, individual portions of the contents are weighed and weighed portions which satisfy the predetermined conditions—acceptable portions—are filled cyclically into the holders and weighed portions which do not satisfy the predetermined conditions are detected and ejected as defective portions, the method being characterized by the following steps:

a) following detection of a defective portion, that holder which the filling line originally predetermined for filling this holder would have filled with the contents portion, on which the defective portion is based, had the contents portion satisfied the predetermined conditions—defective-portion holder—is sensed, and b) a filling line other than that originally predetermined for filling the defective-portion holder—compensating filling line—fills the defective-portion holder, preferably outside the original filling cycle thereof, with an acceptable portion which satisfies the predetermined conditions.

According to the invention, the control and/or regulating means of the apparatus for forming portions of fibrous material, and for removing the same, thus senses that holder which should have been filled by a predetermined filling line, but cannot be filled since there is no acceptable portion available to this filling line with which this (defective-portion) holder can be filled. At least, a corresponding acceptable portion is not available to this filling line at the correct time, e.g. not up to the point in time at which the defective-portion holder, in order to be filled, has been conveyed, relative to the originally envisaged filling line, up to the position which is necessary for filling purposes.

The position of the thus defined defective-portion holder in the holder path and/or relative to the filling lines is preferably sensed, according to the invention, by the position of the defective-portion holder within the path of holders and/or relative to the positions of the filling lines being determined, in particular calculated, by means of suitable control and/or regulating algorithms, preferably immediately following detection of the defective portion by means of a weighing arrangement.

The position is tracked as the holders of the holder path are conveyed further relative to the filling lines. The control and/or regulating of the apparatus determines another filling line of the same filling station, or of a further filling station, which fills the defective-portion holder not filled by the originally predetermined filling line. This filling line, which stands in for the originally predetermined filling line, will be referred to hereinbelow as a compensating filling line.

The compensating filling line fills the defective-portion holder preferably outside its own, original filling cycle. In other words, it fills the defective-portion holder prior to that period of time which, in respect of timing, comes between two regular filling operations of this compensating filling line elapsing. This is possible if the compensating filling line has a certain time reserve, i.e. if a further filling operation can be carried out between the correctly timed filling operations.

As an alternative, of course, it is also conceivable to use a filling line which does not, or usually does not, carry out any correctly timed filling operations and therefore exclusively fills defective-portion holders as required.

In a preferred embodiment, the compensating filling line fills the defective-portion holder immediately after a holder which immediately precedes the defective-portion holder, as seen in the conveying direction of the conveyor, is filled by the compensating filling line in a correctly timed manner, that is to say in accordance with the original filling cycle (of the compensating filling line). In this case, the compensating filling line fills two holders which are arranged one behind the other, as seen in the conveying direction, and immediately follow one another.

The defective-portion holder can be filled by a compensating filling line which is arranged downstream, as seen in the conveying direction, of the filling line which is originally predetermined for filling the holder. This may be a filling line of the same filling station or a filling line of a further filling station.

As an alternative, or in addition, it may be provided that the defective-portion holder is filled by a compensating filling line which is arranged upstream, as seen in the conveying direction, of the filling line which is originally predetermined for filling the holder. For example, a defective portion can be detected even when the defective-portion holder is still located upstream of a compensating filling line which, in turn, is likewise arranged upstream of the defective-portion holder originally predetermined for filling purposes. The control and/or regulating means then communicates to the upstream compensating filling line that it is necessary to fill a defective-portion holder which cannot be filled by a downstream filling line.

In a further embodiment of the invention, following weighing, but prior to a holder being filled by one of the filling lines, one or more acceptable portions are stored on an interim basis for a certain period of time in one or more stores, in particular in a distributor mechanism. This has the advantage, inter alia, that further portions can be weighed even during storage, which reduces the average minimum time intervals in which holders can be filled by the respective filling line.

In a further particular embodiment, a filling line assigned to a first path of holders fills the holders of this holder path cyclically and a filling line assigned to a second holder path, preferably parallel to the first path, serves as a compensating filling line for this second holder path by filling defective-portion holders of this second path as required, the weighed acceptable portions being fed to the two filling lines individually by means of a common distributor mechanism, in particular a distributor turret, which feeds the weighed acceptable portions, as required, to one filling line or the other.

In other words, contents portions are fed to at least two filling lines via a common feeder, a distributor mechanism distributing the acceptable portions to one filling line or the other filling line, namely the compensating filling line. The acceptable portions here are fed to the filling line assigned to the first holder path such that this filling line can execute filling operations in a predetermined filling cycle. The other filling line, in turn, fills only individual holders as required, that is to say when these holders have been sensed as defective-portion holders.

The abovementioned filling lines with common feeder, in the case of parallel holder paths, are preferably arranged on a common line running transversely to the parallel holder paths and/or transversely to the conveying direction of the conveyor. In respect of the conveying direction of the holders, it is also the case here that in each case at least two holders are located vertically one beside the other, i.e. transversely to the holder paths and/or to the conveying direction, in which case they can be filled synchronously, i.e. simultaneously, by the filling lines arranged one beside the other in the vertical direction.

In a further configuration of this embodiment, a holder without contents, which is possibly brought about in the first path by the compensating filling operation of the defective-portion holder of the second path, is filled by a further, downstream or upstream compensating filling line assigned to the first path. This has the following background: in dependence on the speed at which acceptable portions can be fed to filling lines with a common feeder, it may indeed be possible for the compensating filling line assigned to the second path to be supplied with an acceptable portion, but possibly not for the other filling line, operating in a correctly timed manner.

Accordingly, it may only be possible for an acceptable portion to be provided at the correct time to just one of the two filling lines with a common feeder, that is to say, in this case, to the compensating filling line, which provides filling as required. It would thus be possible, in this case, for the other filling line, which operates in a correctly timed manner, due to the lack of any acceptable portion, not to execute the correctly timed filling operation at the correct point in time envisaged. This would, of course, result in a holder without any contents portion in the corresponding first path. This holder without any contents portion is sensed by the control means, "tracked" by the control means in a manner identical to that described above for the defective-portion holders, and filled with an acceptable portion by another, downstream or upstream compensating filling line assigned to the first path.

BRIEF DESCRIPTION OF THE DRAWINGS

Further features of the present invention can be gathered from the accompanying patent claims, from the following description of preferred exemplary embodiments and from the accompanying drawings, in which:

FIGS. 7-8 show the filling lines, arranged one behind the other, from FIG. 3 at two other operational points in time A and B.

DETAILED DESCRIPTION OF PREFERRED EMBODIMENTS

Figure 1:
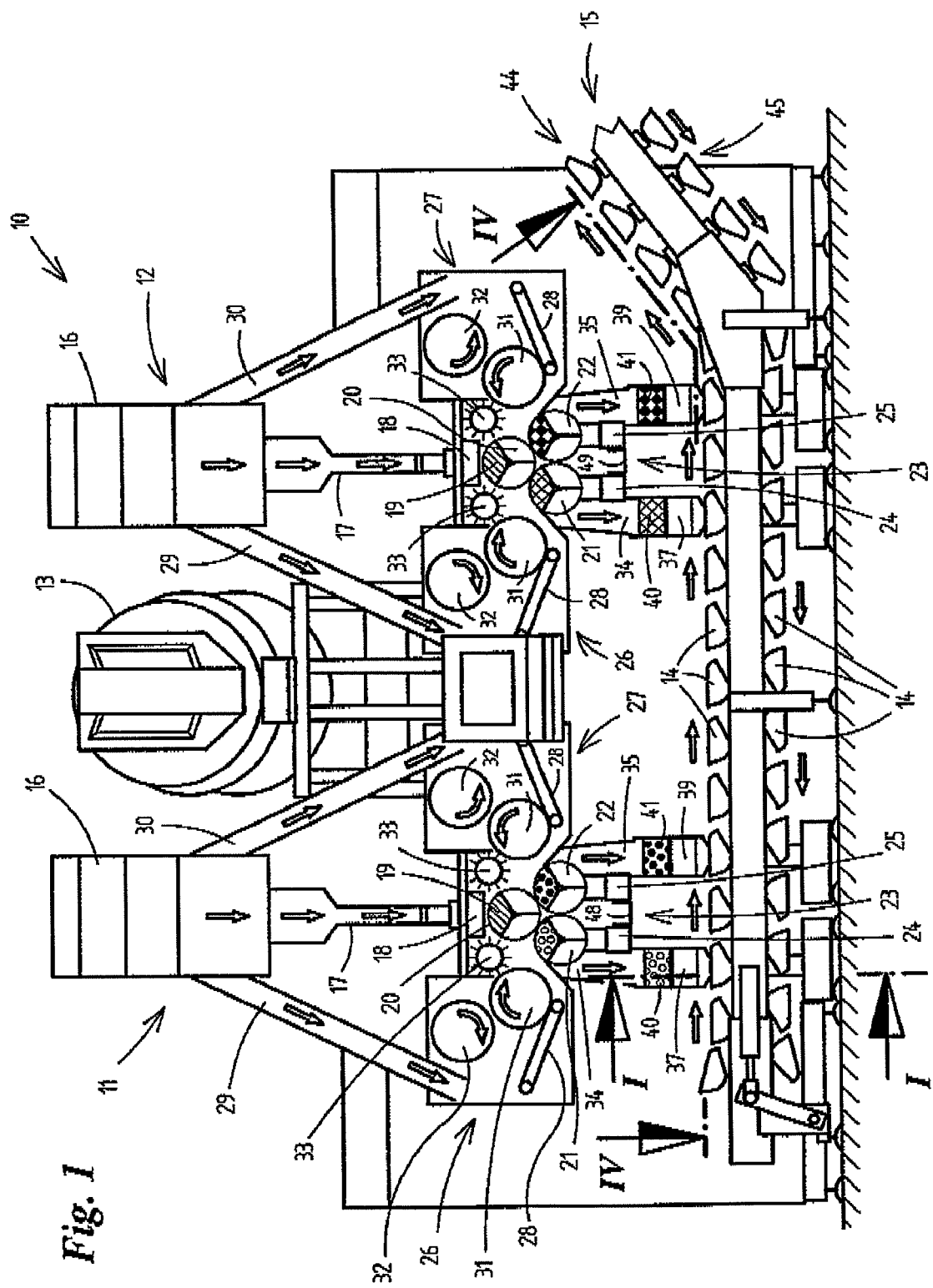
FIG. 1 shows a front overall view of an apparatus for forming and removing tobacco portions which is operated using the method according to the invention.

The drawings show an apparatus 10 for forming individual portions of fibrous material, namely cut tobacco, and for subsequently removing the same.

The apparatus 10 has two filling stations 11, 12, at which tobacco fed from a loosening drum 13 is weighed, apportioned and filled into holders 14, that is to say upwardly open, preferably hopper-like buckets of a bucket chain, of an endless conveyor 15. The portions are fed, by the endless conveyor, to a bag packer for further processing, namely, in particular, in order for the tobacco portions to be packed into suitable bags.

The cut tobacco is located, in the first instance, as a tangled supply of tobacco within the loosening drum 13. Within the loosening drum 13, non-uniform structures of the tobacco and clumps of tobacco are eliminated. For this purpose, the loosening drum 13, or a lateral surface of the loosening drum 13, has, on the inside, corresponding means for loosening and homogenizing the tobacco. These means may be pins and/or needles which are oriented approximately radially into the interior of the drum. The drum itself is inclined obliquely downwards and, in the inclined position, is made to rotate about the centre axis of the drum by a corresponding drive. The loosened tobacco is transported through the drum as a result of the rotation and inclination of the same. The loosening drum 13 may be described, in detail, for example as described in German Patent Application DE 10 2004 063 057.

The tobacco stream passing out of the loosening drum 13 is then divided in a manner which will not be described in any more detail, individual sub-streams being fed to the filling stations 11 and 12, that is to say supply container 16 arranged above the endless conveyor 15. The technical functions and features of the two filling stations 11, 12 will be described hereinbelow by way of example—in so far as they correspond to one another—with reference to the filling station 11.

Within the supply container 16, and within an upright conveying shaft 17, the tobacco of the supply container 16, by virtue of a converging configuration of the conveying path in the downward direction and of further measures which are not explained specifically here, is formed first of all into a tobacco web and then into a tobacco strand, which is conveyed vertically downwards in the conveying shaft 17.

The tobacco strand exiting at the bottom end of the conveying shaft 17 passes into the region of a cutting means 18. This cutting means 18 is used to sever individual coarse tobacco portions. These coarse portions are usually lighter than a desired weight. The cutting means 18 has cutting combs which enter into the tobacco strands from the sides in each case. The supply container 16, the conveying shaft 17 and the cutting means 18 may be designed, for example, as described in DE 33 16 176 A1.

The usually predominantly underdimensioned coarse portions are fed in each case, as tobacco portions 19, to a central intermediate conveying mechanism 20, namely a cell wheel which can be rotated about a horizontal axis of rotation and has a plurality of, namely three, cells 20.1, 20.2, 20.3 which are offset circumferentially by 120° in each case in relation to one another and are intended for accommodating the tobacco portions. The cells or pockets 20.1, 20.2, 20.3 are open on their radially outer side. The intermediate conveying mechanism 20 has different operational states depending on the rotary position. In three upwardly directed positions, in each case one of the cells 20.1, 20.2, 20.3 which are oriented upwards in each case in these positions is filled and, in alternative positions directed obliquely downwards and/or to the side, the coarse tobacco portion can escape from the respective cell under its own weight.

In one of the upwardly directed positions, the intermediate conveying mechanism 20 can accommodate the individual coarse tobacco portions coming from the conveying shaft 17 and hold or store them on an interim basis for a predetermined period of time. The intermediate conveying mechanism 20 can be rotated out of this holding position in the clockwise direction, or in the anti-clockwise direction, into the obliquely downwardly directed position.

Depending on the direction of rotation, the coarse tobacco portion positioned in the corresponding cell 20.1, 20.2 or 20.3 is conveyed into one of the weighing mechanisms 21, 22 belonging to a weighing arrangement 23, the weighing mechanisms being designed as cell wheels and being offset laterally in each case beneath the intermediate conveying mechanism 20. Like the intermediate conveying mechanism 20—the individual weighing mechanisms 21, 22 each have a plurality of cells 21.1-21.3 and 22.1-22.3, respectively, for accommodating the coarse tobacco portions which are conveyed in each case by the intermediate conveying mechanism 20. They are of functionally identical design to the intermediate conveying mechanism 20. The weighing mechanisms 21, 22 here are offset laterally beneath the intermediate conveyor 20 such that a coarse portion sliding out of the cells 20.1, 20.2 or 20.3, which, depending on position, are oriented obliquely downwards, drops into an upwardly oriented cell of the weighing mechanism 21 or 22.

The weighing mechanisms 21, 22, furthermore, interact in each case with weighing scales 24, 25 of the weighing arrangement 23, the weighing scales being assigned in each case to the individual mechanisms. The weighing scales 24, 25 can help to determine in each case the weights of the individual tobacco portions which are positioned in the upwardly directed cell of the respective weighing mechanism 21, 22.

Should the measurement for determining the weight of the tobacco portion show that predetermined conditions have not been satisfied, and that, in particular, the weighed portion is lighter than a predetermined desired weight, additional tobacco can be added to the tobacco portion, to be precise via corresponding fine apportioning units 26 and 27.

Each fine apportioning unit 26, 27 here has an obliquely downwardly directed belt 28 via which fine tobacco fed from the supply container 16, via feed shafts 29 and 30, is fed to a first pin cylinder 31. This pin cylinder 31 receives the tobacco and interacts with a second pin cylinder 32 in order to form as uniform as possible a tobacco layer on the first pin cylinder 31. By virtue of a following pin wheel 33, the tobacco layer is raised up from the pin cylinder 32 and, in a manner which will not be described in any more detail here, added to the coarse portion arranged in the corresponding, upwardly directed cell of the weighing mechanism 21 or 22. The fine apportioning operation, that is to say the addition of further fine tobacco, takes place until the desired weight has been reached, and thus the coarse portion can be classified as an acceptable portion.

It is, of course, possible to store in the control and/or regulating means a variety of different conditions which the weighed acceptable portions have to satisfy in order to be classified as acceptable portions, for example desired-weight limit values, intervals or the like.

The upwardly directed cell of one of the weighing mechanisms 21, 22, in which the acceptable portion is arranged, is then made to rotate such that it empties the acceptable portion into a feeder 34 or 35 arranged beneath the respective weighing mechanism 25, 26, that is to say into upright feed shafts. Acceptable portions which come from the weighing mechanism 25 are conveyed, via the feeder 34, to a central distributor mechanism 40 arranged above two filling lines 36, 37. Acceptable portions which come from the weighing mechanism 26 are conveyed, via a corresponding feeder 35, to a central distributor mechanism 41 arranged above two filling lines 38, 39.

The filling lines 36, 37, 38, 39 are designed as filling shafts. The distributor mechanisms 40, 41 are of functionally identical construction to the intermediate conveying mechanism 20, that is to say they are constructed as cell wheels with three cells 40.1-40.3 and 41.1-41.3, respectively.

The acceptable tobacco portions are fed, by the respective distributor mechanism 40, 41, to the corresponding filling line 36, 37, 38 or 39 of the filling stations 11 and 12, respectively, i.e. are emptied into the filling shafts 36, 37, 38 or 39.

The points in time at which the respective distributor mechanism 40, 41 carries out an emptying operation here are coordinated with the holders 14, which are conveyed past beneath the filling lines 36, 37, 38, 39, such that the respective acceptable portion drops directly into the corresponding holder 14 conveyed past it along the respective filling line 36, 37, 38, 39.

In order to form the holder paths 46, 47, the endless conveyor 15 has a plurality of parallel, endless conveying mechanisms which are designed as endless chains 42, 43 and on which the holders 14 are fastened. The chains 42, 43 or holder paths 46, 47, and the corresponding holders 14 assigned to the respective holder path 46, 47, run parallel and at a distance from one another to form a top conveying strand 44 and a bottom, return strand 45. The endless conveyor 15 and/or the two holder paths 46, 47 run/runs horizontally beneath the filling lines 36, 37, 38, 39 in the region of the filling stations 11 and 12.

At the rear end of the top conveying strand 44, as seen in the conveying direction, the conveyor 15 is inclined obliquely upwards. In an emptying station (not illustrated), those holders 14 of the conveyor 15 which are filled with acceptable portions are automatically emptied, and fed to a bag packer for further processing, by virtue of the holders being tilted as a result of the chains 42, 43 being deflected upon transfer from the top conveying strand 44 into the return strand 45.

Despite the presence of the fine apportioning units 26, 27, it may be established that, when the individual portions are weighed in the weighing mechanisms 21, 22, it is no longer possible to use the weighed portion, for example when the weight of the weighed portion, following addition of further fine tobacco, is above a predetermined desired value or when the weight of the original coarse portion is already above the desired value.

These unacceptable or defective portions are ejected by virtue of the weighing mechanisms 21, 22 being rotated such that the defective portion is emptied into an ejecting arrangement, for example into an obliquely downwardly inclined ejecting channel 48.

Further special features of the invention relate to regulating and/or controlling or the regulating and/or control arrangement of the apparatus 10, in particular in respect of the individual filling operations. Each filling station 11, 12—as has already been described—has in each case four filling lines 36-39, via which the holders 14 of the holder paths 46, 47 can be filled. The filling stations 11, 12 here are arranged one behind the other, as seen in the conveying direction of the endless conveyor 15.

Figure 2:
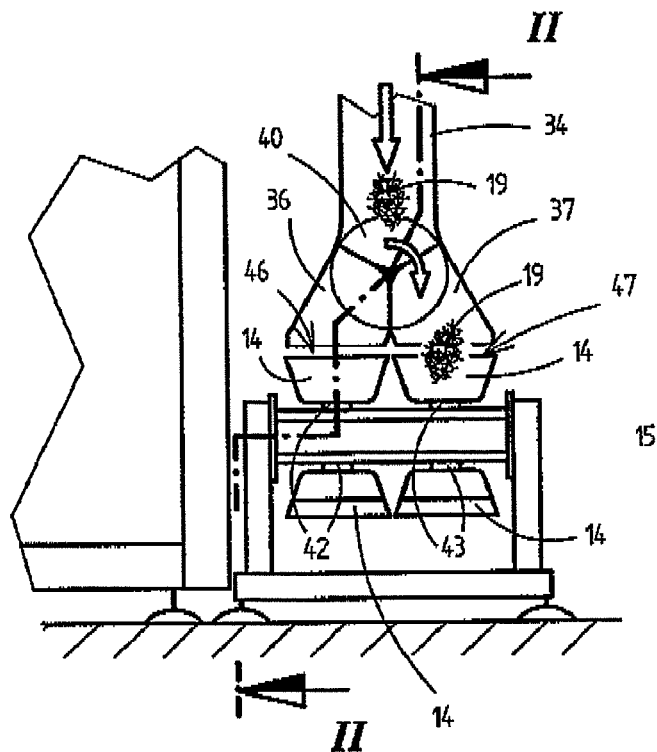
FIG. 2 shows a partial section through the installation along section line I-I in FIG. 1, namely two filling lines of a filling station which are assigned to different paths.

In each case two filling lines of each filling station 11, 12 are assigned to a conveying path. Thus, the filling lines 37, 39 in FIG. 2 are assigned to the right-hand conveying path 47, i.e. the filling lines 37 can fill holders 14 in this right-hand conveying path 47 with acceptable portions. These filling lines 37, 39 are arranged one behind the other, as seen in the conveying direction of the endless conveyor 15. Similarly, the filling stations 11, 12 each have two filling lines 36, 38 which are arranged one behind the other and can fill the holders 14 of the left-hand conveying path 46 in FIG. 2. Overall, four conveying lines arranged one behind the other are thus provided for each conveying path.

The filling lines 36, 38, which are arranged one behind the other as seen in the conveying direction of the endless conveyor 15 and belong to the upstream filling station 11, as seen in the conveying direction of the endless conveyor 15, cyclically fill a first path 46 of holders 14 of the endless conveyor 15, this path being arranged beneath the filling lines 36, 38 and, in other words, being the left-hand holder path 46 illustrated in FIG. 2. The filling lines 37, 39, which are likewise arranged one behind the other as seen in the conveying direction of the endless conveyor 15 and belong to the second, downstream filling station 12, as seen in the conveying direction of the endless conveyor 15, cyclically fill the corresponding right-hand holder path 47, which is arranged beneath the filling lines 37, 39.

The control and/or regulating means here predetermines a filling cycle, i.e. an average period of time between two regular filling operations of one of the cyclically operating filling lines.

In contrast, the respectively other filling lines 37, 39 of the first filling station 11, these filling lines being assigned to the right-hand holder path 47, fill the holders 14 of the right-hand holder path 47 only as required. The same applies to the other filling lines 36, 38 of the second filling station 12, these filling lines being assigned to the left-hand holder path 46.

The more precise relationships will be explained hereinbelow:

In a particular embodiment, control and/or regulation takes place such that, following detection of a defective portion in one of the weighing mechanisms 21 or 22, that holder 14 which the filling line originally predetermined for filling this holder 14 would have filled had the contents portion satisfied the predetermined conditions, in particular the desired weight for an acceptable portion, is sensed. This holder for which the corresponding contents portion, i.e. the defective portion, was originally envisaged, will be referred to hereinbelow as a defective-portion holder.

Accordingly, upon detection of a defective portion, the control means not only emits a signal for ejecting the defective portion, but rather also senses, that is to say determines and/or calculates by means of suitable control and/or regulating algorithms, that holder for which the defective portion was envisaged. The control and/or regulating means then "tracks" the defective-portion holder that moves further in the conveying direction along the conveying path or the holder path, i.e. as the individual holders of the holder path are moved further beneath the filling lines.

It is preferable, for this purpose, for a corresponding flag to be set in a shift register of the control and/or regulating means, this shift register being assigned to the endless conveyor 15, in particular the holder paths and/or the holders.

Tracking the empty defective-portion holder makes it possible for the defective-portion holder 14 to be filled with an acceptable portion at a filling line other than that originally envisaged for this purpose, as soon as the defective-portion holder moves past this other filling line for possible filling purposes. The other filling line, which finally carries out the operation of filling the defective-portion holder, will be referred to, within the context of this application, as a compensating filling line.

Figure 3:
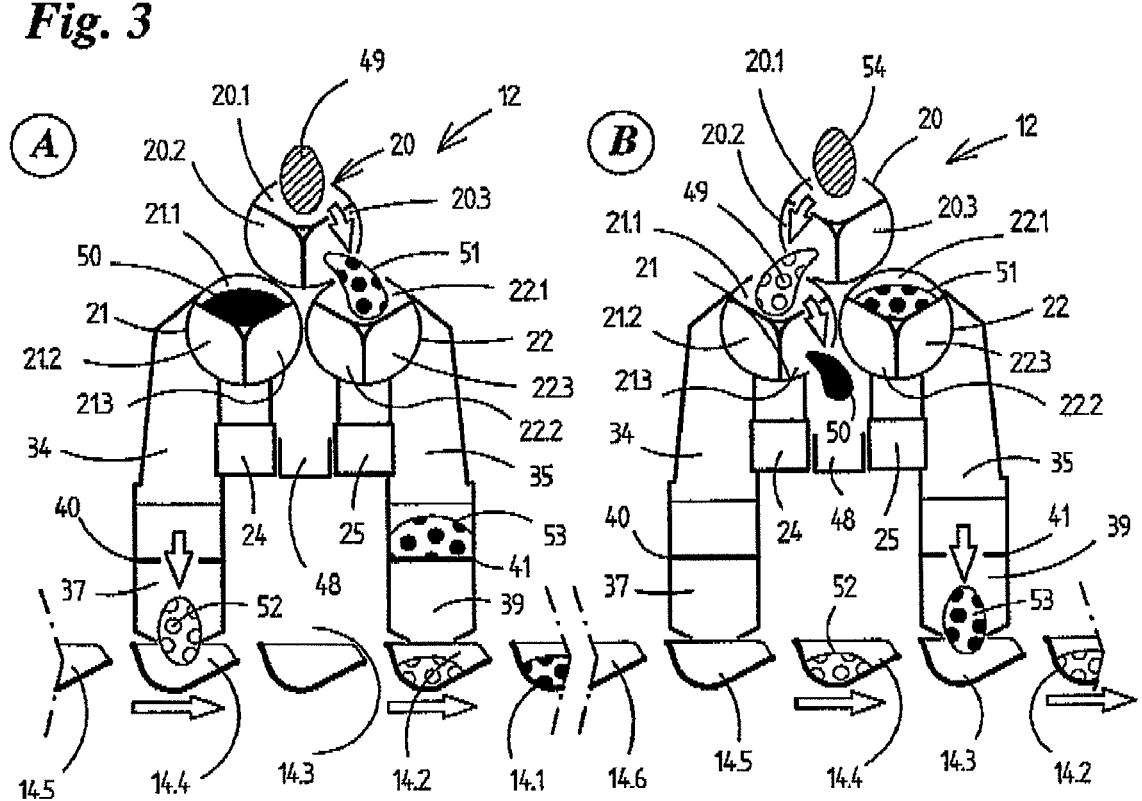
FIG. 3 shows a section through the filling station of FIG. 2 along section line II-II, namely two filling lines of the filling station, arranged one behind the other as seen in the conveying direction, at two different operational points in time A and B.
Figure 4:
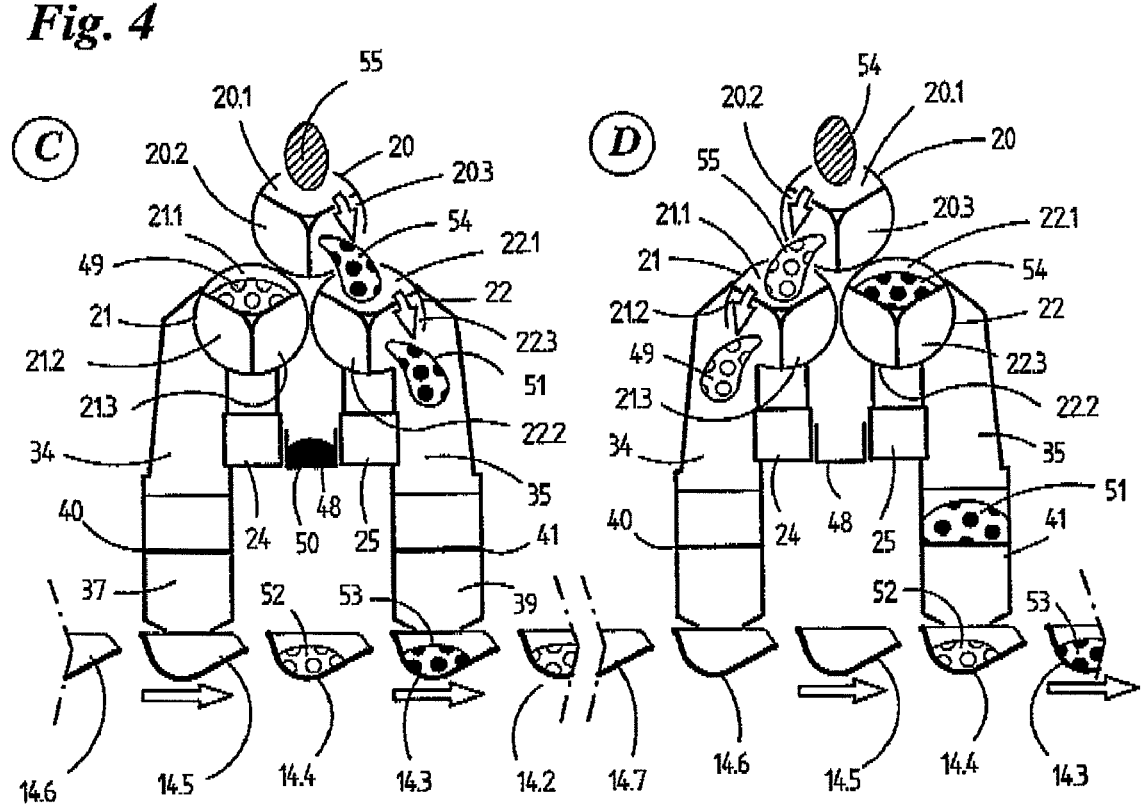
FIG. 4 shows two respectively later operational points in time C and D of the filling lines, arranged one behind the other, from FIG. 3.
Figure 5:
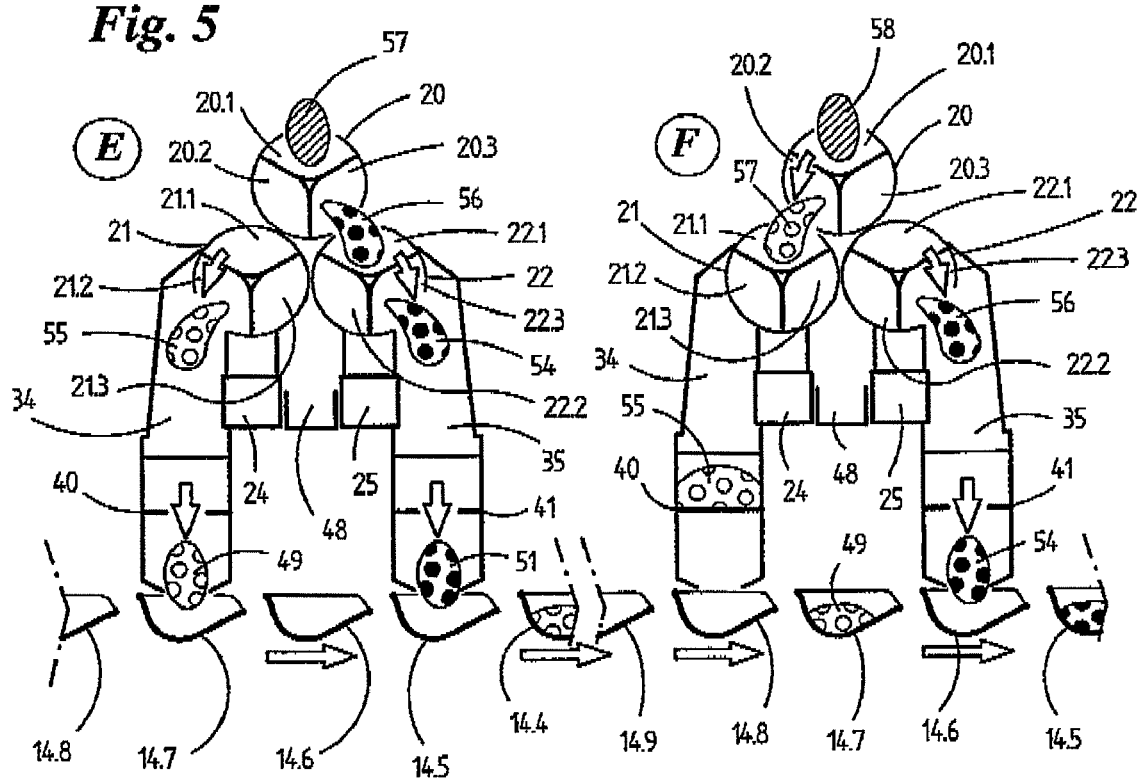
FIG. 5 shows two respectively later operational points in time E and F of the filling lines, arranged one behind the other, from FIG. 3.

An alternative for filling defective-portion holders according to the invention will be explained in more detail with reference to FIGS. 3-5, in other words the operation of a defective-portion holder which cannot be filled by a first, upstream filling line being filled by a second, downstream filling line. FIGS. 3-5 here show the filling lines 37, 39 of the second filling station 12, these filling lines being assigned to the right-hand holder path 47, at various, successive operational points in time A, B, C, D, E, F.

At point in time A in FIG. 3, the top cell 20.1 of the intermediate conveying mechanism 20 is filled with a coarse tobacco portion 49. The top cell 21.1 of the weighing mechanism 21 arranged laterally therebeneath, on the left-hand side of the drawing, contains a detected defective portion 50, i.e. a portion which is heavier than a predetermined desired weight. Such defective portions are detected by the corresponding portion being weighed in the weighing mechanism 21 and by the control and/or regulating means of the apparatus 10 comparing the weighed weight with a desired weight. If underdimensioning of the original coarse portion is established, first of all further fine tobacco is added in individual steps via the fine apportioning unit, the respective overall weight of the portion being measured anew in each case following the addition. Should the end weight of the portion be above a desired weight, or should the weight of the original coarse portion already be above the desired weight, the portion is recognized as a defective portion.

At the point in time A illustrated, the top cell 22.1 of the right-hand weighing mechanism 22 is being filled with a coarse portion 51 which is to be weighed. The left-hand distributor mechanism 40, which is common to the filling lines 36, 37, empties an acceptable portion 52 into a holder 14.4 of the holder path 47 via the filling line 37. The right-hand distributor mechanism 41 stores an acceptable portion 53 in its top cell. The acceptable portions are portions which, following weighing and following the possible addition of further tobacco by the fine apportioning units, correspond to a predetermined desired weight.

The individual emptying operations of the intermediate conveying mechanism 20, of the weighing mechanisms 21, 22 and of the distributor mechanisms 23, 24 have already been explained above. They are brought about by these mechanisms, which are designed as cell wheels, rotating about a horizontal axis of rotation, in which case the tobacco portion contained in the respective cell drops laterally downwards out of the cell under its own weight.

At the point in time B, the holders 14 of the holder path 47 have been moved to the right in each case by the extent of one holder 14. At the point in time B illustrated, the top cell 20.1 is being filled with a new coarse portion 54. The coarse portion 49 is being emptied into the left-hand weighing mechanism 21. The defective portion 50 is being ejected into the ejecting channel 48. The acceptable portion 53 is being emptied into the holder 14.3 which is envisaged for this portion and corresponds to the filling cycle for the line 39. The individual filling lines 37, 39 each fill every second holder 14. The left-hand filling line 37 here in the first instance fills, in a correctly timed manner, the holders 14 with an even-numbered index 14.2, 14.4, 14.6, etc. The right-hand filling line 39, correspondingly, fills the holders 14 with an odd-numbered index 14.1, 14.3, 14.5 etc. The predetermined filling cycle thus predefines that the filling line 14.5 is to be filled by the filling line 39 and the holder 14.6 in contrast is to be filled by the filling line 37. As can be seen at the point in time B, this holder 14.6 should have been filled with that portion on which the ejected defective portion 50 is based if this portion had satisfied the predetermined conditions, namely the desired weight.

Using suitable algorithms, the control and/or regulating means of the apparatus 10 determines the holder 14.6 as that (defective-portion) holder for which the defective portion 50, or the portion on which the defective portion 50 is based, was determined and it tracks this holder 14.6, i.e. senses the position of this defective-portion holder relative to the filling lines, in which case another filling line, namely, in the present exemplary embodiment, the filling line 39, can perform the task of filling this defective-portion holder. This will be explained in more detail hereinbelow.

At the slightly later point in time C in FIG. 4, the holders 14 have not yet been conveyed further. However, the coarse portion 54 in the top cell 20.1 of the intermediate conveyor is already being emptied into the top cell 22.1 of the right-hand weighing mechanism 22. The coarse portion 51 has been weighed in the interim. Tobacco has been added, if appropriate, to the coarse portion 51 by means of the fine apportioning unit 27 in order to achieve the predetermined desired weight.

Finally, at the point in time C illustrated, the portion 51 is being emptied as an acceptable portion 51, along the feeder 35, into the distributor mechanism 41, i.e. is being conveyed to the distributor mechanism 41.

At a later point in time D, the holders 14 have each been moved to the right, once again, by the extent of one holder 14. The top cell 20.1 of the intermediate conveying mechanism 20 is being filled with a new coarse portion 56. The coarse portion 55 is being emptied into the left-hand weighing mechanism 21. The portion 49, previously weighed in the left-hand weighing mechanism 21, is being emptied as an acceptable portion 49 into the left-hand distributor mechanism 40. It can be seen that at the left-hand filling line 37, for the purpose of filling the defective-portion holder 14.6 which would have to have been filled by this filling line in accordance with the predetermined cycle, there is no acceptable portion available with which the defective-portion holder 14.6 could be filled in a correctly timed manner. At the point in time D, the defective-portion holder 14.6 is located directly beneath the filling line 37, i.e. in a position in which the same could be, or would have to be, filled. Since there is no acceptable portion available at the filling line 37, the holder remains empty, i.e. unfilled.

At a later point in time E in FIG. 5, the holders 14 have each been moved to the right, once again, by the extent of one holder 14. The top cell 20.1 of the intermediate conveying mechanism 20 is being filled with a new coarse portion 57. The coarse portion 55 has been weighed in the left-hand weighing mechanism 21 and is being emptied as an acceptable portion 55 into the left-hand distributor mechanism 40. It is particularly important, then, that the control and/or regulating means instructs the left-hand filling line 37 to fill, instead of the defective-portion holder 14.6, which it was not able to fill, the following holder 14.7, which should actually have been filled by the filling line 39. At the point in time E, the right-hand filling line 39 also fills, as planned, the holder 14.5 with the acceptable portion 51, this holder being predetermined for the filling line 39.

At a later point in time F, the holders 14 have each been moved to the right, once again, by the extent of one holder 14. The top cell 20.1 of the intermediate conveying mechanism 20 is being filled with a new coarse portion 58. The coarse portion 57 is being emptied into the left-hand weighing mechanism 21. The coarse portion 56 has been weighed in the right-hand weighing mechanism 22 and is being emptied as an acceptable portion 56 into the right-hand distributor mechanism 40. It is particularly important that the control and/or regulating means instructs the right-hand filling line 39 to fill the defective-portion holder 14.6 outside the cycle. In contrast to the regular filling sequences, the filling line 39 thus fills two holders one after the other, that is to say the holders 14.5 and 14.6. As proceedings continue, this results in a cycle shift of the filling operations because, as from this point in time, the left-hand filling line 37 fills the holders with an odd-numbered index 14.7, 14.9, 14.11, etc. and the right-hand filling line, in contrast, fills the holders with an even-numbered index 14.6, 14.8, 14.10. etc.

Figure 6:
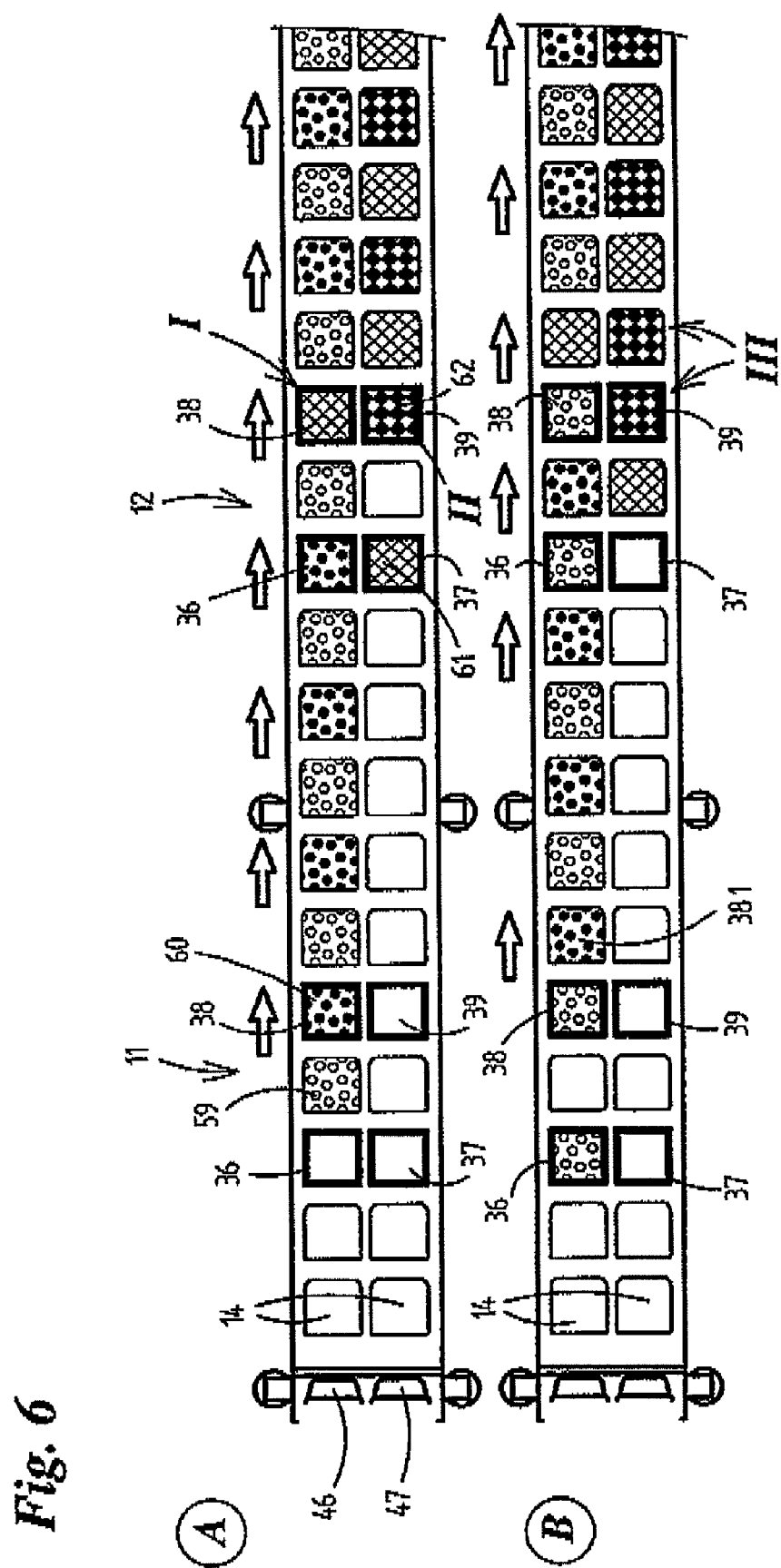
FIG. 6 shows a section through the apparatus from FIG. 1 along section line IV-IV, namely two plan views of the holders of an endless conveyor of the apparatus at two other operational points in time A and B.

FIG. 6 illustrates a further embodiment of the control and/or regulation of the operation for filling the holders 14 and of the compensation for defective-portion holders. This figure visualizes the possibility of it being possible to compensate for defective portions not just by a filling line of one and the same filling station, but also by a filling line of another, following filling station.

The top drawing of FIG. 6 here shows a first operational point in time A of the endless conveyor 15, and the bottom drawing shows a later operational point in time B, at which all the holders 14 have been moved to the right by the extent of one holder. The individual positions of the filling lines 36-39 of the two filling stations 11 and 12 are indicated in bold outlines.

The shading 59 illustrates acceptable portions in the holders 14 which can come either from the filling line 36, assigned to the holder path 46, or from the filling line 37, assigned to the other holder path 47, of the first filling station 11, which is arranged upstream of the second filling station 12. The shading 60 illustrates acceptable portions in the holders 14 which can come either from the filling line 38, assigned to the holder path 46, or from the filling line 39, assigned to the other holder path 47, of the first filling station 11.

The shading 61 illustrates acceptable portions in the holders 14 which can come either from the filling line 36, assigned to the holder path 46, or from the filling line 37, assigned to the other holder path 47, of the second, downstream filling station 12. The shading 62 illustrates acceptable portions in the holders 14 which can come either from the filling line 38, assigned to the holder path 46, or from the filling line 39, assigned to the other holder path 47, of the second filling station 12.

It can readily be seen that the filling lines 36-39 of the first filling station 11 usually fill, i.e. where correct timing is concerned, only the holders of the holder path 46, and the filling lines 36-39 of the second filling station 12 usually fill only the holders of the holder path 47. Specifically, the filling lines 36, 38 of the first filling station 11 fill the holders of the holder path 46 in a correctly timed manner, and the filling lines 37, 39 fill the holders of the holder path 47 in a correctly timed manner.

It can also be seen that, as an exception, the second filling station 12 has filled a defective-portion holder of the holder path 46, because a holder 14 with shading 61, designated I, can be seen in the top path 46. This holder 14 is a defective-portion holder which has been caused by a defective portion in the filling line 38 of the first filling station 11. The empty defective-portion holder has finally been filled by the filling line 36 of the second filling station 12.

The filling operation by the compensating filling line 36 of the second filling station, however, results, at the same time, in an unfilled holder in the second holder path 47. This has the following background: acceptable portions are fed to the filling lines 36, 37 of the second filling station 12—as has already been explained in more detail above—via one and the same feeder 34 and the same distributor mechanism 40. At a certain point in time, in this embodiment, it is thus possible to make an acceptable portion available either just to the filling line 36 or just to the filling line 37, and thus only one of these filling lines can execute a filling operation.

At the point in time of the compensating filling operation of the defective-portion holder in the path 46, this compensating filling operation being brought about by the filling line 36, the filling line 37 would have to have carried out correctly timed filling of that holder of the path 47 which is arranged on the same vertical line, in relation to the conveying direction, as the defective-portion holder and is parallel to the same. The parallel holder, which would have to have been filled more or less simultaneously, is designated II. The simultaneous filling described was not possible, in which case a holder without any contents portion has likewise arisen in the path 47. This holder without any contents portion has then been filled by the following compensating filling line of the same filling station 12, in which case two acceptable portions with shading 62 can be seen one behind the other at III.

As is known by a person skilled in the prior art, it may also be possible, as an alternative, to execute two filling operations of filling lines with a common feeder at least more or less simultaneously, but in any case at least at time intervals which are sufficient to fill parallel holders, i.e. ones located on a common vertical line. Whether this is possible or not depends on the speed at which the holders are moved past the filling lines and/or on the residence time of the holders in positions beneath the filling lines in which these can be filled, and on the speed at which the filling operations can be executed.

FIGS. 7 and 8, finally, show an embodiment of the control and/or regulating means in which a compensating filling operation is executed by a filling line which is arranged upstream of the filling line for which the defective portion was envisaged. FIGS. 7 and 8 here show the filling lines 37, 39 of the second filling station 12, these filling lines being assigned to the right-hand holder path 47, at various, successive operational points in time A and B.

At point in time A, the top cell 20.1 of the intermediate conveying mechanism 20 has been filled with a coarse tobacco portion 65. The top cell 21.1 of the weighing mechanism 21 arranged therebeneath, on the left-hand side of the drawing, contains a coarse portion 64, of which the weight is being determined. The intermediate conveying mechanism 20 empties a coarse portion 63 into the top cell 22.1 of the right-hand weighing mechanism 22. The individual filling lines 37, 39 each fill every second holder 14. The left-hand filling line 37 here fills, in a correctly timed manner, the holders 14 with an even-numbered index 14.2, 14.4, 14.6, etc. The right-hand filling line 39, correspondingly, fills the holders 14 with an odd-numbered index 14.1, 14.3, 14.5, etc. The predetermined filling cycle thus predefines that the holder 14.5 is to be filled by the filling line 39 and the holder 14.6, in contrast, is to be filled by the filling line 37.

The right-hand weighing mechanism 22 empties a defective portion 66 into the ejecting channel 48. The defective portion 66 was intended for the right-hand filling line 39, by means of which the portion on which the defective portion 66 is based would have been filled into the holder 14.5. The top cell of the distributor mechanism 40 has been filled with an acceptable portion 67, and the top cell of the distributor mechanism 41 has been filled with an acceptable portion 68.

At a somewhat later point in time B, at which the holders 14 have been moved to the right by somewhat less than the extent of one holder, the top cell 20.1 of the intermediate conveying mechanism 20 has been filled with a new coarse tobacco portion 69. The coarse tobacco portion 65 is emptied into the left-hand weighing mechanism 21. The coarse portion 64 has been weighed in the left-hand weighing mechanism 21 and is being emptied into the distributor mechanism 40. The acceptable portion 67 is being filled by the compensating filling line 37 into the holder 14.5, in which case both the holder 14.4 and the holder 14.5 have been filled by the compensating filling line 37.

In contrast to the regular filling sequences, the compensating filling line 37 thus fills two holders, one behind the other. As proceedings continue, this results in a cycle shift because, as from this point in time, the left-hand filling line 37 fills the holders with an odd-numbered index 14.7, 14.9, 14.11, etc., and the right-hand filling line, in contrast, fills the holders with an even-numbered index 14.6, 14.8, 14.10 etc.

As is known by a person skilled in the art, the individual control and/or regulating variants can readily be replaced by known control and/or regulating arrangements, suitable sensors, etc., in which case the precise design of the aforementioned arrangements, sensors, etc. is not given.

| | List of designations: |
|---|---|
| 10 | Apparatus |
| 11 | Filling station |
| 12 | Filling station |
| 13 | Loosening drum |
| 14 | Holders |
| 15 | Endless conveyor |
| 16 | Supply container |
| 17 | Conveying shaft |
| 18 | Cutting means |
| 19 | Tobacco portion |
| 20 | Intermediate conveying mechanism |
| 20.1-20.3 | Cells |
| 21 | Weighing mechanism |
| 21.1-21.3 | Cells |
| 22 | Weighing mechanism |
| 22.1-22.3 | Cells |
| 23 | Weighing arrangement |
| 24 | Weighing scales |
| 25 | Weighing scales |
| 26 | Fine apportioning unit |
| 27 | Fine apportioning unit |
| 28 | Belt |
| 29 | Feed shaft |
| 30 | Feed shaft |
| 31 | Pin cylinder |
| 32 | Pin cylinder |
| 33 | Pin wheel |
| 34 | Feeder |
| 35 | Feeder |
| 36 | Filling line |
| 37 | Filling line |
| 38 | Filling line |
| 39 | Filling line |
| 40 | Distributor mechanism |
| 40.1-40.3 | Cells |
| 41 | Distributor mechanism |
| 41.1-41.3 | Cells |
| 42 | Chain |
| 43 | Chain |
| 44 | Top conveying strand |
| 45 | Bottom, return strand |
| 46 | Left-hand conveying path |
| 47 | Right-hand conveying path |
| 48 | Ejecting channel |
| 49 | Coarse tobacco portion |
| 50 | Contents portion |
| 51 | Contents portion |
| 52 | Contents portion |
| 53 | Contents portion |
| 54 | Contents portion |
| 55 | Contents portion |
| 56 | Contents portion |
| 57 | Contents portion |
| 58 | Contents portion |
| 59 | Shading |
| 60 | Shading |
| 61 | Shading |
| 62 | Shading |
| 63 | Contents portion |
| 64 | Contents portion |
| 65 | Contents portion |
| 66 | Contents portion |
| 67 | Contents portion |
| 68 | Contents portion |

What is claimed is:

1. A method of forming portions of fibrous material and of removing the same by an endless conveyor (15) having at least one path of holders (14) for a respective portion of the fibrous material, comprising the steps of:
a) weighing individual portions of the fibrous material;
b) determining which of the weighed individual portions satisfy predetermined conditions as acceptable portions;
c) detecting and ejecting as defective portions the weighed individual portions that do not satisfy the predetermined conditions;
d) filling cyclically the holders (14) with the acceptable portions of the weighed individual portions at least two filling lines (36-39) of at least one filling station (11, 12);
e) following the detecting of a defective portion, sensing as a defective-portion holder the holders (14) that one of the at least two filling lines (36-39) originally predetermined for filling the holders (14) would have filled with the defective portion had the weighed individual portion satisfied the predetermined conditions;
f) tracking the position of the sensed defective-portion holder during the conveying movement thereof, at least until the defective-portion holder is filled by a compensating filling line, the compensating filling line being another of the at least two filling lines (36-39) other than the filling lines (36-39) originally predetermined for filling the defective-portion holder; and
g) using the compensating filling line, filling the defective-portion holder with an acceptable portion that satisfies the predetermined conditions.

2. An apparatus for forming portions of fibrous material and for removing the same, comprising:
a) an endless conveyor (15) having at least one path (46, 47) of holders (14), the holders for holding a respective portion of the fibrous material;
b) filling lines (36-39) having at least one filling station (11, 12), the filling lines (36-39) for filling the holders (14) at the filling station (11, 12);
c) at least one weighing arrangement (23) for weighing individual portions of the fibrous material, wherein the weighed individual portions that satisfy predetermined conditions are fed cyclically to the filling lines (36-39) as acceptable portions, and the weighed individual portions that do not satisfy the predetermined conditions are detected and ejected as defective portions; and
d) a control and/or regulating arrangement for:
(i) sensing, following the detecting of a defective portion in the weighing arrangement (23), as a defective-portion holder the holders (14) that one of the filling lines (36-39) originally predetermined for filling the holders (14) would have filled with the defective portion had the weighed individual portion satisfied the predetermined conditions, and
(ii) tracking the position of the sensed defective-portion holder during the conveying movement thereof, at least until the defective-portion holder is filled by a compensating filling line, the compensating filling line being another of the filling lines (36-39) other than the filling lines (36-39) originally predetermined for filling the defective-portion holder, wherein the compensating filling line fills the defective-portion holder outside the actual filling cycle thereof with an acceptable portion that satisfies the predetermined conditions.

3. The method according to claim 1, wherein the defective-portion holder is sensed by the position of the defective-portion holder within a path (46, 47) of the holders (14) and/or relative to the positions of the filling lines being determined by means of suitable control and/or regulating algorithms immediately following detection of the defective portion by means of a weighing arrangement (23).

4. The method according to claim 1, wherein the compensating filling line (36-39) fills the defective-portion holder immediately after the holder (14) which immediately precedes the defective-portion holder, as seen in the conveying direction of the conveyor (15), is filled in a correctly timed manner in accordance with the original filling cycle of the compensating filling line (36-39).

5. The method according to claim 1, wherein the defective-portion holder is filled by a compensating filling line (36-39) which is arranged downstream, as seen in the conveying direction, of the filling line (36-39) originally predetermined for filling the holder (14).

6. The method according to claim 1, wherein the defective-portion holder is filled by a compensating filling line (36-39) which is arranged upstream, as seen in the conveying direction, of the filling line (36-39) originally predetermined for filling the holder (14).

7. The method according to claim 1, wherein following weighing, but prior to the holder (14) being filled, at least one acceptable portions are stored on an interim basis for a certain period of time in at least one store for accommodating the weighed individual portions.

8. The method according to claim 1, wherein correctly timed filling operations at the individual filling lines (36, 38; 37, 39), which are arranged one behind the other as seen in the conveying direction, take place simultaneously in each case.

9. The method according to claim 8, wherein the filling line (36-39) assigned to a first holder path (46, 47) fills the holders (14) of this first holder path (46, 47) in a correctly timed manner, and in that a the filling line (36-39) assigned to a second holder path (46, 47) serves as a compensating filling line for the second holder path (46, 47) by filling the defective-portion holders of the second holder path as required, the acceptable portions being fed to the two filling lines individually by means of a common distributor mechanism (40, 41) which feeds the acceptable portions, as required, to one or the other of the filling lines (36-39).

10. The method according to claim 9, wherein one of the holders (14) without contents, which is brought about within the first holder path (46, 47) by the compensating filling operation of the defective-portion holder of the second holder path (46, 47), is sensed and filled with an acceptable portion by a further, downstream or upstream compensating filling line (36-39) assigned to the first holder path (46, 47).

11. The apparatus according to claim 2, wherein the conveyor (15) has a plurality of holder paths (46, 47) and a plurality of the filling lines (36-39) assigned to different ones of the holder paths (46, 47), the filling lines being connected functionally to a common feeder (34, 35) via which the acceptable portions are fed to each of the connected filling lines (36-39).

12. The apparatus according to claim 11, wherein, for the purpose of distributing the acceptable portions to the filling lines (36-39) as required, the filling station (11, 12) has a distributor mechanism (40, 41) by means of which the acceptable portions are conveyed, as required, to the individual filling lines (36-39) which are connected functionally to the common feeder (34, 35).

13. The apparatus according to claim 12, wherein the weighing arrangement (23) has at least one weighing mechanism (21, 22) which has a plurality of cells and in which the fibrous material is weighed, and in that the weighing mechanism (21, 22) interacts functionally with the common feeder of the filling lines (36-39) such that, by virtue of the weighing mechanism (21, 22) being rotated in a first direction of rotation, the acceptable portions are conveyed to the distributor mechanism (40, 41) via the common feeder (34, 35).

14. The apparatus according to claim 13, wherein, by virtue of the weighing mechanism (21, 22) being rotated in the opposite direction of rotation, the defective portion (50, 66) is ejected.

15. The apparatus according to claim 11, wherein there are two of the filling lines (36-39), the filling lines are filling shafts arranged above the holder paths (46, 47), and the common feeder (34, 35) is a feed shaft.

16. The apparatus according to claim 12, wherein the distributor mechanism is a cell wheel.

17. The method according to claim 1, wherein the compensating filling line fills the defective-portion holder outside the original filling cycle thereof.

18. The method according to claim 7, wherein the store for accommodating contents portions is a cell wheel.

19. The method according to claim 9 wherein the second holder path is parallel to the first holder path.

* * * * *